(12) United States Patent
Collins (10) Patent No.: US 12,416,496 B1
(45) Date of Patent: Sep. 16, 2025

(54) LEVELING AND SPACING DEVICE

(71) Applicant: Roger D. Collins, St. Petersburg, FL (US)

(72) Inventor: Roger D. Collins, St. Petersburg, FL (US)

( * ) Notice: Subject to any disclaimer, the term of this patent is extended or adjusted under 35 U.S.C. 154(b) by 0 days.

(21) Appl. No.: 18/931,932

(22) Filed: Oct. 30, 2024

Related U.S. Application Data (60) Provisional application No. 63/571,904, filed on Mar. 29, 2024.

(51) Int. Cl.
*G01C 9/26* (2006.01)
*G01B 3/04* (2006.01)

(52) U.S. Cl.
CPC .................. *G01C 9/26* (2013.01); *G01B 3/04* (2013.01)

(58) Field of Classification Search
CPC .................................... G01C 9/26; G01B 3/04
See application file for complete search history.

(56) References Cited

U.S. PATENT DOCUMENTS

| | | | | |
|---|---|---|---|---|
| 4,194,295 A | | 3/1980 | Simuro et al. | |
| 5,884,411 A | * | 3/1999 | Raber | E04G 21/18 269/910 |
| 5,937,531 A | * | 8/1999 | Menk | E04G 21/1891 33/645 |
| 6,839,973 B1 | * | 1/2005 | Woodward | G01C 9/28 33/343 |
| 6,895,684 B1 | * | 5/2005 | Firth | E04G 21/1891 33/562 |
| 6,910,666 B2 | | 6/2005 | Burr | |
| 6,935,041 B2 | * | 8/2005 | Orton | E04G 21/1891 33/613 |
| 7,159,328 B1 | * | 1/2007 | Duda | B43L 7/14 33/484 |
| 7,213,377 B1 | * | 5/2007 | Sackett | E04C 3/02 52/696 |
| 7,254,920 B2 | * | 8/2007 | Steele | E04F 21/185 33/371 |
| 8,061,051 B2 | * | 11/2011 | Allemand | G01C 9/34 D10/69 |
| 8,087,177 B2 | * | 1/2012 | Chisholm | G01B 3/566 33/383 |

(Continued)

FOREIGN PATENT DOCUMENTS

CN 218345963 U 1/2023

*Primary Examiner* — Yaritza Guadalupe-McCall
(74) *Attorney, Agent, or Firm* — Lori Woodward (57) ABSTRACT

A leveling and spacing device may include an elongated device body. A level may be provided on the device body. At least two spaced-apart member notches may be provided in the device body. Accordingly, a first structure member of the building structure may initially be deployed in place in the structure. The device body of the leveling and spacing device may be deployed in place on the first structure member by inserting the first structure member into a first member notch in the device body. A second structure member may then be positioned adjacent to the first structure member and in alignment with a second member notch in the device body. The device body may then be lowered in place onto the second structure member as a second member notch receives the second structure member. The second structure member may then be attached to the first structure member, and the process repeated.

20 Claims, 4 Drawing Sheets

(56) References Cited

U.S. PATENT DOCUMENTS

| | | | |
|---|---|---|---|
| 8,117,760 B1* | 2/2012 | Revell | G01B 3/08 |
| | | | 33/456 |
| 8,191,335 B2* | 6/2012 | Davis | E04G 21/1891 |
| | | | 33/645 |
| 8,209,874 B1 | 7/2012 | Tribble et al. | |
| D686,926 S | 7/2013 | Moe | |
| 8,656,603 B1* | 2/2014 | Rush | E04F 21/1855 |
| | | | 33/647 |
| 8,732,972 B2* | 5/2014 | Jordan | E04G 21/1891 |
| | | | 33/613 |
| 8,850,710 B1* | 10/2014 | Rodrigue | G01C 9/28 |
| | | | 33/376 |
| D750,984 S | 3/2016 | Ben Josef et al. | |
| D805,928 S | 12/2017 | Ben Josef et al. | |
| 11,740,082 B2* | 8/2023 | Neitzell | G01C 25/00 |
| | | | 29/525.01 |
| 2003/0200667 A1* | 10/2003 | Orton | E04G 21/1891 |
| | | | 33/465 |
| 2006/0010703 A1* | 1/2006 | Gauthier | E04G 21/1891 |
| | | | 33/613 |
| 2006/0265895 A1* | 11/2006 | Daugherty | G01B 3/04 |
| | | | 33/613 |
| 2012/0255186 A1* | 10/2012 | Allen | E06B 1/04 |
| | | | 33/194 |
| 2013/0111775 A1* | 5/2013 | Davis | E04G 21/1891 |
| | | | 33/613 |
| 2016/0018206 A1* | 1/2016 | Hollis | G01C 9/28 |
| | | | 33/354 |
| 2016/0024791 A1* | 1/2016 | Reno | E04C 3/02 |
| | | | 52/745.21 |

* cited by examiner

LEVELING AND SPACING DEVICE

CROSS-REFERENCE TO RELATED APPLICATIONS

This application claims the benefit of U.S. Provisional Patent Application Ser. No. 63/571,904, filed on Mar. 29, 2024, which is incorporated by reference herein in its entirety.

FIELD OF THE INVENTION

The present invention relates generally to tools and devices used in construction of buildings, and more particularly, to a leveling and spacing device which can be used to expeditiously deploy structure members of a roof truss and/or stud wall assembly or other building structure at a desired distance spacing for securement of the structure members in the structure.

BACKGROUND OF THE INVENTION

Various types of tools and devices are known in the construction industry to facilitate fabrication of homes, offices and other buildings. Some of the more common types of tools include hammers, nail guns, screw guns, saws, chalk line, tape measures, speed squares, levels and the like. Each tool is typically configured to perform a particular purpose in the fabrication process.

A level is a common type of tool which is extensively used in home and professional construction projects. A common type of level is a liquid level, which includes one or more liquid filled transparent or translucent tubes. A small air bubble may be present in the liquid. A marking may be provided at the center of the tube. When the device is oriented either horizontally or vertically, the prospective air bubble will align with the center of the tube when the device is on perfect level plane. If the level is not oriented perfectly horizontally or vertically, the bubble will move to one side of the marking on the tube such that the user can adjust the orientation of the structure being measured to the desired horizontal or vertical level orientation.

In construction of the roof of a structure, construction crews may waste valuable time and effort resulting in costly crane rental fees in addition to risking their safety by traditionally carrying many tools not limited to measuring tapes, hammers, screw guns or nail guns, levels, additional materials used as spacers or bridges, etc. to an extreme height when building a roof. Carrying all these items while climbing up onto, then standing atop or within the unfinished structure framework can be very awkward and dangerous. This plethora of tools has traditionally been required to ensure that trusses are securely fastened perpendicular to the side walls on which they will rest and are parallel to the adjacent truss with the correct spacing during construction. Typically, construction workers may utilize a load of prefabricated trusses that are to be used to form the roof of the structure. A crane may hoist the trusses to top of walls, set them onto the structure walls then hold the trusses in place temporarily across the walls of the structure until the crane's boom can be safely released from the then secured truss. Prior to being released, each truss must be level-adjusted to perpendicular in relation to the side walls and then spaced, braced, and secured. A worker on the ground may have previously cut 2-by-4-inch spacer blocks which are 22.5 inches long and then nailed those blocks to the trusses on the ground. The crane then lifts and sets one of those trusses across the walls. The workers high above the ground must hold that truss in place by hand in a precarious position while attaching that truss to the previous truss that has already been braced and secured with a nail gun, hammer, nails, or screws; and finally, the worker releases the truss from the crane's boom, and the process is repeated. However, this process is laborious, and time-consuming, requires worker to hold many individual tools and is quite dangerous. Sometimes 22.5-inch spacers are not used, requiring the worker to measure the distance the trusses are set apart with measuring tape while holding by hand the new truss to the required distance from adjacent truss then securing it, further complicating the perpendicular and parallel level adjustment, proper spacing and fastening procedures.

Accordingly, there is need for a leveling and spacing device which can be used to expeditiously deploy structure members of a truss or other building structure at a desired spacing for securement of the structure members in the structure.

SUMMARY OF THE INVENTION

The present invention is directed to a measuring, leveling and spacing device which is a multi-function tool to expeditiously deploy structure members of a roof, stud wall or other building structure at the building code required (16 inches on center or 24 inches on center distance spacing) while level adjusting trusses to perpendicular in respect to the structure walls and parallel to adjacent trusses for securement of the structure members in the structure. This is accomplished by utilizing just one tool for these tasks. Additionally, the device can be clipped to worker's tool belt or other area freeing worker's hands when climbing up to roof heights, standing in or on building structure. The 36-inch end-to-end device length with the incorporation of both decimal and metric rulers on device edge allow device to be used as a conventional yard stick and measuring device as well. An illustrative embodiment of the leveling and spacing device may include an elongated device body. At least one bubble level may be provided on the device body. At least two spaced-apart member notches may be provided in the device body. Each member notch may be suitably sized and shaped to accommodate a corresponding structure member of the building structure. Accordingly, a first structure member of the building structure may initially be deployed in place in the structure. That first structure member is leveled to perpendicular in relation to the side walls, braced and secured in place. The device body of the leveling/spacing device may be deployed in place on the first structure member by inserting the first structure member into a first member notch in the device body as the device body is lowered in place onto the first structure member. A second structure member may then be positioned adjacent to the first structure member and in alignment with a third member notch (if building code calls for 24 inches on center truss placement). If the building code dictates 16 inches on center truss placement, then the second member notch in the device body is used. The device body may then be lowered in place onto the second structure member as the third- or second-member notch receives the second structure member. The second structure member may then be held in place by the device, attached to the first structure member at proper distance saving labor of cutting then attaching spacer blocks to the trusses on the ground and the process repeated.

In an illustrative implementation of the invention, a leveling and spacing device which can be used to expeditiously deploy structure members of a roof, wall or other building structure at a desired distance spacing for securement of the structure members in the structure may include an elongated device body. At least one of a horizontal level and a vertical level may be provided on the device body. At least two spaced-apart member notches may be provided in the device body, e.g, three member notches. Each member notch may be suitably sized and shaped to accommodate a corresponding structure member of the building structure. Accordingly, for 16 inches on center configurations, a first structure member 192 (FIG. 5) of the building structure roof, stud wall or other building structure may initially be placed on floor or braced to desired level and then may be reinforced in the structure. The leveling and spacing device second body end bumper 178 is butted against the first structure member 192. Then the device body of the leveling and spacing device may be lowered onto the second structure member 190 by inserting the second structure member into the device second member notch in the device body as the device body is lowered in place onto the third structure member 186 into the device first member notch in the device body. The third structure member may then be attached to the second structure member then the first structure member, and the process repeated. A third structure member may also be abutted to the second end 114 of the device body 102 (see FIG. 5), and adjacent to second structure member where 16 inch on center spacing is required.

In another illustrative implementation of the invention, a leveling and spacing device which can be used to expeditiously deploy structure members of a roof or other building structure at a desired distance spacing for securement of the structure members in the structure may include an elongated device body. A horizontal level and a vertical level may be provided on the device body. At least one ruler having at least one set of graduated ruler markings may be provided along the length of the device body. At least two spaced-apart member notches may be provided in the device body. Each member notch may be suitably sized and shaped to accommodate a corresponding structure member of the building structure. Accordingly, in FIG. 4, a first structure member of the building structure may initially be deployed in place in the structure. The device body of the leveling and spacing device may be deployed in place on the first structure member by inserting the first structure member into a first member notch in the device body as the device body is lowered in place onto the first structure member. A second structure member may then be positioned adjacent to the first structure member and in alignment with a third member notch in the device body if 24 inch spacing is required. The device body may then be lowered in place onto the second structure member as the third member notch receives the second structure member. The second structure member may then be attached using a bracing strip A (FIG. 4) to the first structure member, and the process repeated.

In a second aspect, the device body may include a lower body surface, an upper body surface, a front body surface, a rear body surface, a first body end and a second body end.

In another aspect, at least one grip aperture may extend through the device body from the front body surface to the rear body surface.

In another aspect, the grip aperture may be elongated with a pair of curved grip aperture sides and a flat grip aperture bottom and a curved grip aperture top.

In another aspect, at least one hanging aperture may be provided in the device body. The hanging aperture may facilitate hanging of the leveling and spacing device from a hook or other support when not in use.

In another aspect, a pair of hanging apertures may extend through the device body from the front body surface to the rear body surface adjacent to each corresponding first body end and second body end. Each hanging aperture may or may not have a plurality of multi-faceted hanging aperture surfaces.

In another aspect, the horizontal level may include a horizontal level aperture extending through the device body from the front body surface to the rear body surface and a horizontal level tube spanning the horizontal level aperture.

In another aspect, the horizontal level aperture may or may not have a plurality of multifaceted level aperture surfaces. The horizontal level tube may extend horizontally between the level aperture surfaces.

In another aspect, the vertical level may include a vertical level aperture extending through the device body from the front body surface to the rear body surface and a vertical level tube spanning the vertical level aperture.

In another aspect, the vertical level aperture may or may not have a plurality of multifaceted level aperture surfaces. The vertical level tube may extend vertically between the level aperture surfaces.

In another aspect, the ruler may extend along the upper body surface of the device body.

In another aspect, the ruler may have a first ruler end proximate the first body end, a second ruler end proximate the second body end, a front ruler edge proximate the front body surface and a rear ruler edge proximate the rear body surface of the device body. The graduated ruler markings may extend along at least one of the front ruler edges and the rear ruler edge.

In another aspect, the graduated ruler markings may include a first set of graduated ruler markings extending along the front ruler edge and a second set of graduated ruler markings extending along the rear ruler edge of the ruler.

In another aspect, the first set of graduated ruler markings may include inch markings and the second set of graduated ruler markings may include centimeter markings.

In another aspect, a top-level opening may extend through the ruler and the upper body surface of the device body in communication with the horizontal level aperture. The horizontal level tube may be visible through the top-level opening.

In another aspect, at least two of the spaced-apart member notches may be disposed at a distance spacing of 16 inches with respect to each other.

In another aspect, at least two of the spaced-apart member notches may be disposed at a distance spacing of 24 inches with respect to each other.

In another aspect, each member notch in the device body may have a rectangular or square cross-section with a planar interior notch surface and a pair of parallel, spaced-apart, planar side notch surfaces extending from the interior notch surface.

In another aspect, an end bumper may be provided on each corresponding one of the first body end and the second body end of the device body.

In another aspect, the member notches may include a first member notch proximate the first body end of the device body, a second member notch spaced-apart from the first member notch and a third member notch spaced-apart from the second member notch.

In another aspect, the second member notch may be disposed at a distance spacing of 16 inches with respect to the first member notch in the device body and the end bumper at the second body end of the device body may be disposed at a distance spacing of 16 inches with respect to the second member notch. The third member notch may be disposed at a distance spacing of 8 inches with respect to the second member notch.

In another aspect, at least one attachment clip may be provided on the device body to facilitate attachment of the leveling and spacing device to a belt, clothing or other article, allowing for safe, hands-free transport of the device to a roof or wall height of the construction zone.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments, unless the claims state otherwise. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. As used throughout the specification and claims, the term "comprising" can also encompass the terms "consisting essentially of" and "consisting of". The term "about" has the meaning reasonably ascribed to it by a person skilled in the art when used in conjunction with a stated numerical value or range, i.e., denoting from the exact stated value or range to somewhat more or somewhat less than the stated value or range, from a deviation of from 0% with respect to the stated value or range to up to and including 10% of the stated value or range in either direction.

Shown throughout the figures, the present invention is directed toward a leveling and spacing device which can be used to expeditiously deploy structure members of a truss or other building structure at a desired distance spacing for securement of the structure members in the structure.

Figure 2:
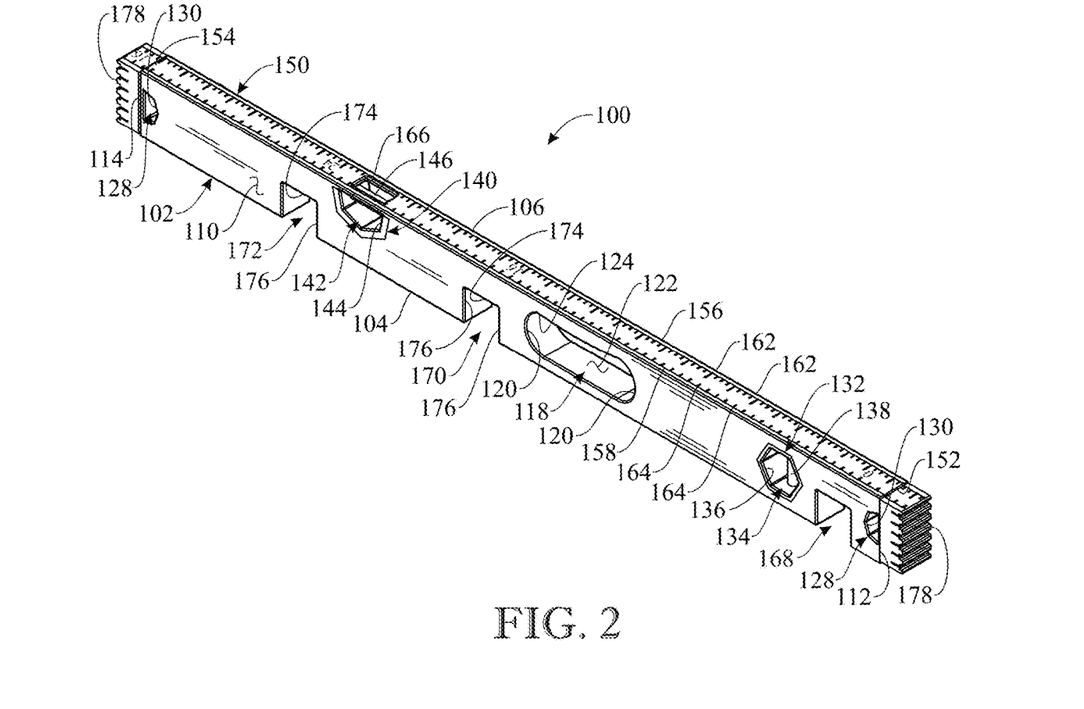
FIG. 2 presents a rear perspective view of the leveling and spacing device illustrated in FIG. 1.
Figure 3:
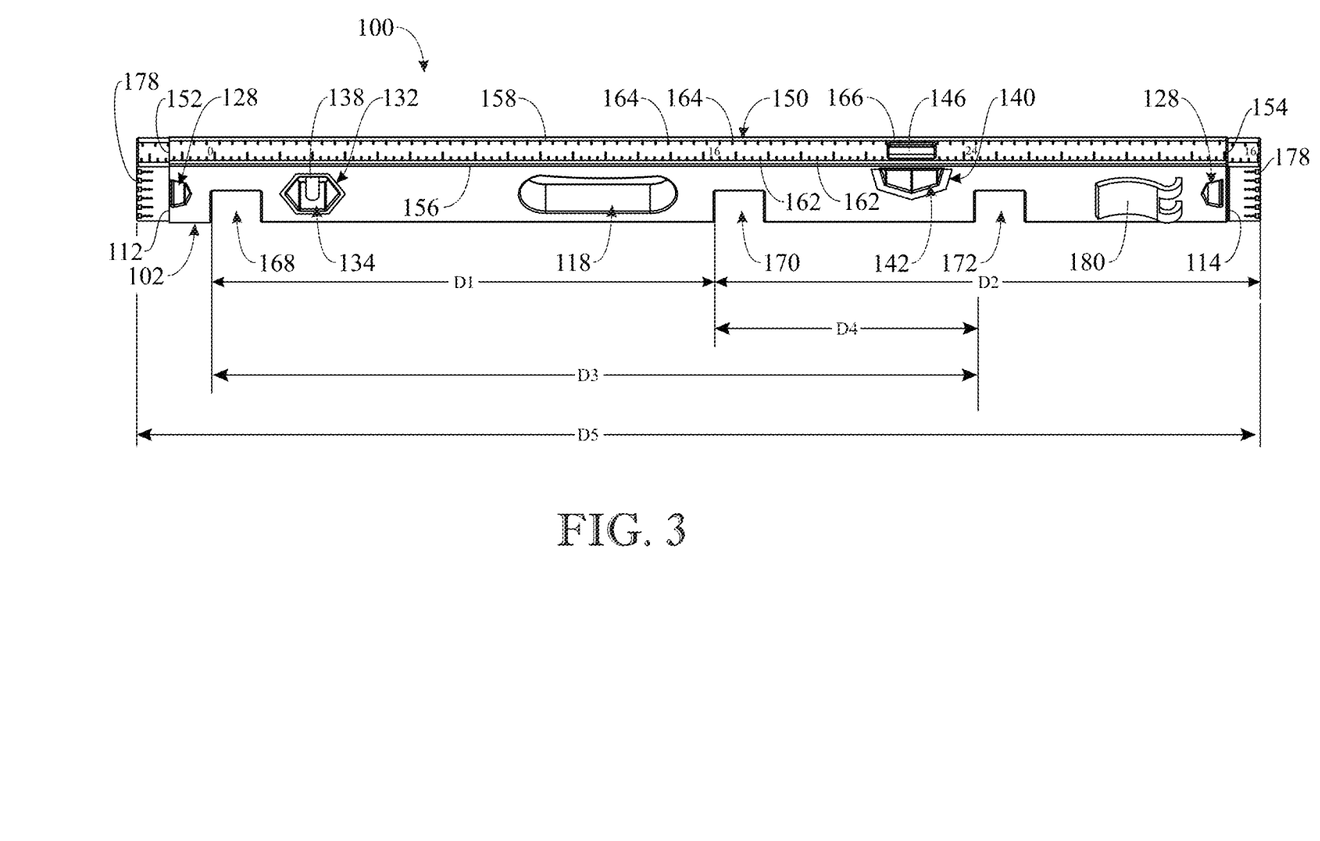
FIG. 3 presents a top perspective view of the leveling and spacing device, more particularly illustrating a typical distance spacing distance of 16 inches D1 between adjacent first and second member notches in the device body and a distance spacing distance of 16 inches D2 between the second member notch and a second body end of the device body of the leveling and spacing device; distance spacing distance of 24 inches D3 between the first and third member notches in the device body and the distance spacing of 8 inches D4 between the second member notch and third member notch in the device body, distance spacing of 36 inches D5 from end bumper on the first body end to the end bumper of the second body end.
Figure 4:
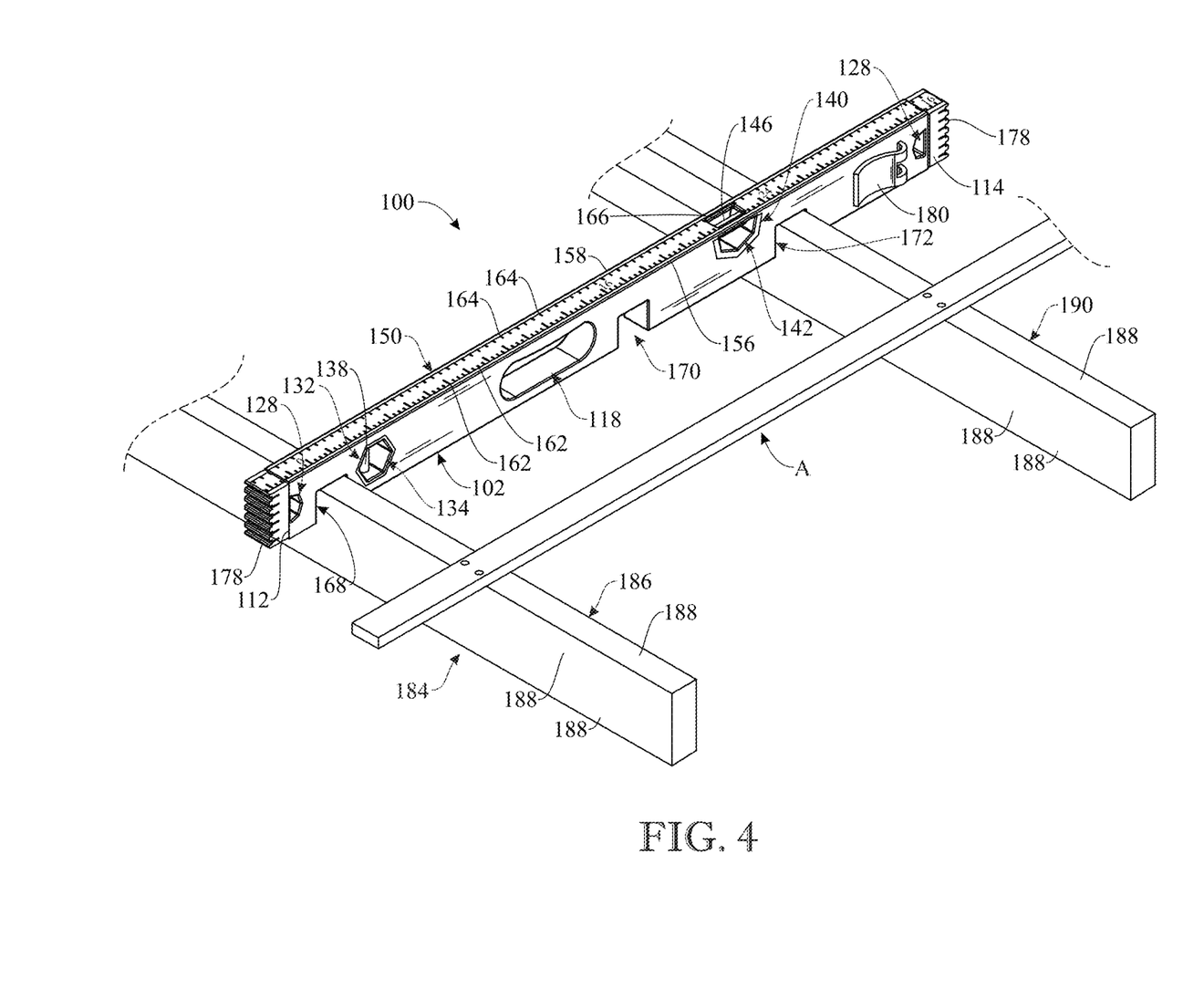
FIG. 4 presents a front perspective view illustrating typical placement of a pair of adjacent first and second structure members of a building structure into the respective first and third member notches in the device body of the leveling and spacing device in typical application of the leveling and spacing device.

Referring initially to FIGS. 1-5, a leveling and spacing device 100 is illustrated in accordance with an exemplary embodiment of the present invention. As shown for instance in FIG. 1, the leveling and spacing device 100 may include an elongated device body 102. At least one level 132, 140 may be provided on the device body 102. At least two spaced-apart member notches 168, 170, 172 may be provided in the device body 102. Each member notch 168, 170, 172 may be suitably sized and shaped to accommodate a corresponding structure member 186, 190 (FIG. 4) of a building structure 184. Accordingly, as illustrated in FIG. 4, in typical application of the leveling and spacing device 100, which will be hereinafter further described, a first structure member 186 of the building structure 184 may initially be deployed in place in the building structure 184. The device body 102 of the leveling and spacing device 100 may be deployed in place on the first structure member 186 by inserting the first structure member 186 into a first member notch 168 in the device body 102 as the device body 102 is lowered in place onto the first structure member 186. A second structure member 190 may then be positioned adjacent to the first structure member 186 and in alignment with a third member notch 172 in the device body 102 if 24-inch spacing distances between the members are required. The device body 102 may then be lowered in place onto the second structure member 190 as a third member notch 172 receives the second structure member 190. The second structure member 190 may then be attached to the first structure member 186, such as via a bracing strip A, and the process repeated.

In some embodiments, at least one of a horizontal level 140 and a vertical level 132 may be provided on the device body 102. Both a horizontal level 140 and a vertical level 132 may be provided on the device body 102. At least one ruler 150 having at least one set of graduated ruler markings 162, 164 may be provided along the length of the device body 102.

In some embodiments, the device body 102 may include a lower body surface 104, an upper body surface 106, a front body surface 108, a rear body surface 110, a first body end 112 and a second body end 114. The device body 102 may have a square or rectangular cross-section with the lower body surface 104, the upper body surface 106, the front body surface 108 and the rear body surface 110 extending from the first body end 112 to the second body end 114. The device body 102 may be fabricated of wood, plastic, metal, composite materials, or combinations thereof.

At least one grip aperture 118 may extend through the device body 102 from the front body surface 108 to the rear body surface 110. The grip aperture 118 may be sized and configured to accommodate one or more fingers of a user (not illustrated) for carrying and handling purposes. For example, and without limitation, in some embodiments, the grip aperture 118 may be elongated and elliptical with a pair of curved grip aperture sides 120 and a flat grip aperture bottom 122 and a curved grip aperture top 124 extending there between.

In some embodiments, at least one hanging aperture 128 may be provided in the device body 102. Each hanging aperture 128 may facilitate hanging of the leveling and spacing device 100 from a hook or other support (not illustrated) when not in use. In some embodiments, a pair of hanging apertures 128 may extend through the device body 102 from the front body surface 108 to the rear body surface 110 adjacent to each corresponding first body end 112 and second body end 114. In some embodiments, each hanging aperture 128 may have a plurality of multi-faceted interior hanging aperture surfaces 130. In other embodiments, the multi-faceted interior hanging aperture surfaces 130 may be omitted from each hanging aperture 128 and each hanging aperture 128 may have a single aperture surface.

In some embodiments, the horizontal level 140 may include a horizontal level aperture 142 which extends through the device body 102 from the front body surface 108 to the rear body surface 110. A liquid-filled, horizontal level tube 146, which may be standard or conventional in design, may span the horizontal level aperture 142.

In some embodiments, the horizontal level aperture 142 of the horizontal level 140 may have a plurality of multi-faceted level aperture surfaces 144. In other embodiments, the multifaceted level aperture surfaces 144 may be omitted from each horizontal level aperture 142 and each horizontal level aperture 142 may have a single aperture surface. The horizontal level tube 146 may extend horizontally between the level aperture surfaces 144.

In some embodiments, the vertical level 132 may include a vertical level aperture 134 which extends through the device body 102 from the front body surface 108 to the rear body surface 110. A liquid-filled, vertical level tube 138 may span the vertical level aperture 144.

In some embodiments, the vertical level aperture 134 of the vertical level 132 may have a plurality of multifaceted level aperture surfaces 136. In other embodiments, the multi-faceted level aperture surfaces 136 may be omitted from each vertical level aperture 134 and each vertical level aperture 134 may have a single aperture surface. The vertical level tube 138 may extend vertically between the level aperture surfaces 136.

In some embodiments, the ruler 150 may extend along the upper body surface 106 of the device body 102. The ruler 150 may have a first ruler end 152 proximate the first body end 112, a second ruler end 154 proximate the second body end 114, a front ruler edge 156 proximate the front body surface 108 and a rear ruler edge 158 proximate the rear body surface 110 of the device body 102. The graduated ruler markings 162, 164 may extend along at least one of the front ruler edge 156 and the rear ruler edge 158.

In some embodiments, the graduated ruler markings 162, 164 may include a first set of graduated ruler markings 162 which may extend along the front ruler edge 156 and a second set of graduated ruler markings 164 which may extend along the rear ruler edge 158 of the ruler 150. The first set of graduated ruler markings 162 may include inch and/or other American markings and the second set of graduated ruler markings 164 may include centimeter and/or other metric markings, for example and without limitation.

Figure 1:
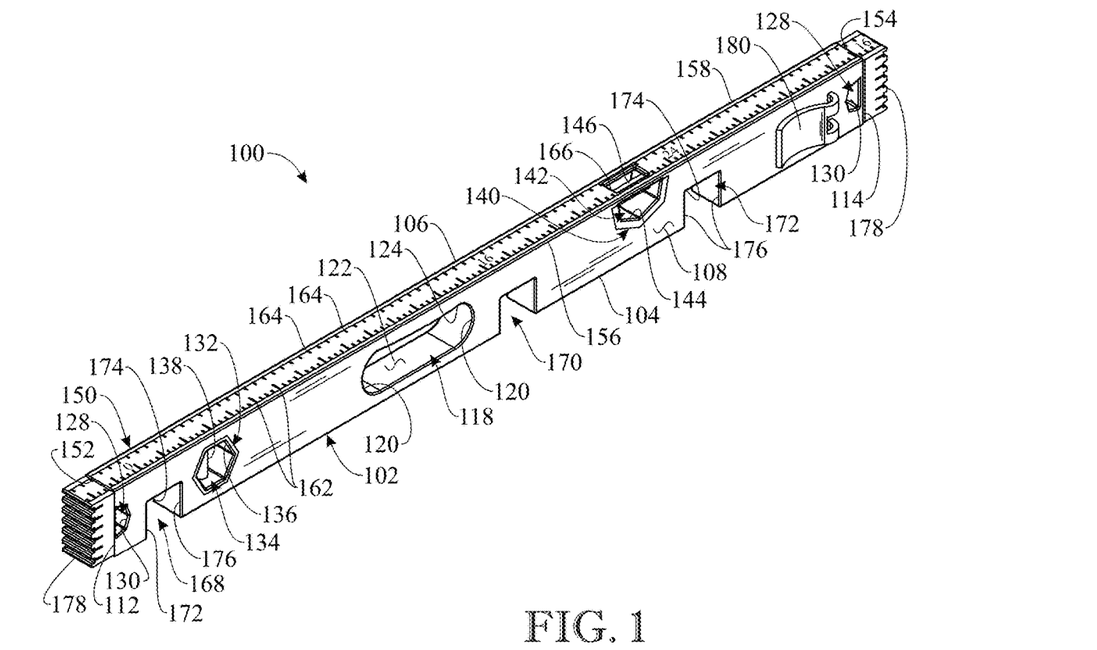
FIG. 1 presents a front perspective view illustrating a leveling and spacing device in accordance with an illustrative embodiment of the present invention.

As illustrated in FIGS. 1 and 2, a top level opening 166 may extend through the ruler 150 and the upper body surface 106 of the device body 102 in communication with the horizontal level aperture 142 of the horizontal level 140. The horizontal level tube 146 may be visible through the top level opening 166.

In some embodiments, at least two of the spaced-apart member notches 168, 170, may be disposed at a distance spacing of 16 inches with respect to each other. In some embodiments, at least two of the spaced-apart member notches 168, 172 may be disposed at a distance spacing of 24 inches with respect to each other.

As illustrated in FIG. 4, each member notch 168, 170, 172 in the device body 102 may have a size and shape which matches the cross-sectional shape of each corresponding first structure member 186 and second structure member 190 of the building structure 184. For example, and without limitation, in some embodiments, each of the first structure member 186 and the second structure member 190 may have a rectangular or square cross-section with multiple structure member sides 188. Accordingly, as illustrated in FIGS. 1 and 2, each member notch 168, 170, 172 in the device body 102 may have a rectangular or square cross-section with a planar interior notch surface 174. A pair of parallel, spaced-apart, planar side notch surfaces 176 may extend from the interior notch surface 174. As further illustrated in FIG. 4, the interior notch surfaces 174 and the side notch surfaces 176 (FIG. 1) may engage the respective structure member sides in deployment of the first structure member 186 and the second structure member 190 in the respective member notches 168, 172.

In some embodiments, an end bumper 178 may be provided on each corresponding one of the first body end 112 and the second body end 114 of the device body 102. Each end bumper 178 may be fabricated of rubber, plastic and/or other flexible or resilient material. In some embodiments, the length of the ruler 150 may be extended beyond the respective first body end 112 and second body end 114 across the upper surface of each end bumper 178, as illustrated.

As illustrated in FIG. 3, in some embodiments, the member notches may include a first member notch 168 proximate the first body end 112 of the device body 102, a second member notch 170 spaced-apart from the first member notch 168 and a third member notch 172 spaced-apart from the second member notch 170. The second member notch 170 may be disposed at a distance spacing D1 of 16 inches with respect to the first member notch 168 in the device body 102, and the end bumper 178 at the second body end 114 of the device body 102 may be disposed at a distance spacing D2 of 16 inches with respect to the second member notch 170. The third member notch 172 may be disposed at a distance spacing D3 of 24 inches with respect to first member notch 168 adjacent to the first body end 112 of the device body 102. The device 100 may have a distance D5 of 36" from end bumper 178 on first body end 112 to end bumper 178 on the second body end 114.

In some embodiments, at least one attachment clip 180 may be provided on the device body 102 in FIGS. 1, 3 and 4, near the second body end 114. The attachment clip 180 may facilitate attachment of the leveling and spacing device 100 to a belt, clothing or other article (not illustrated).

Figure 5:
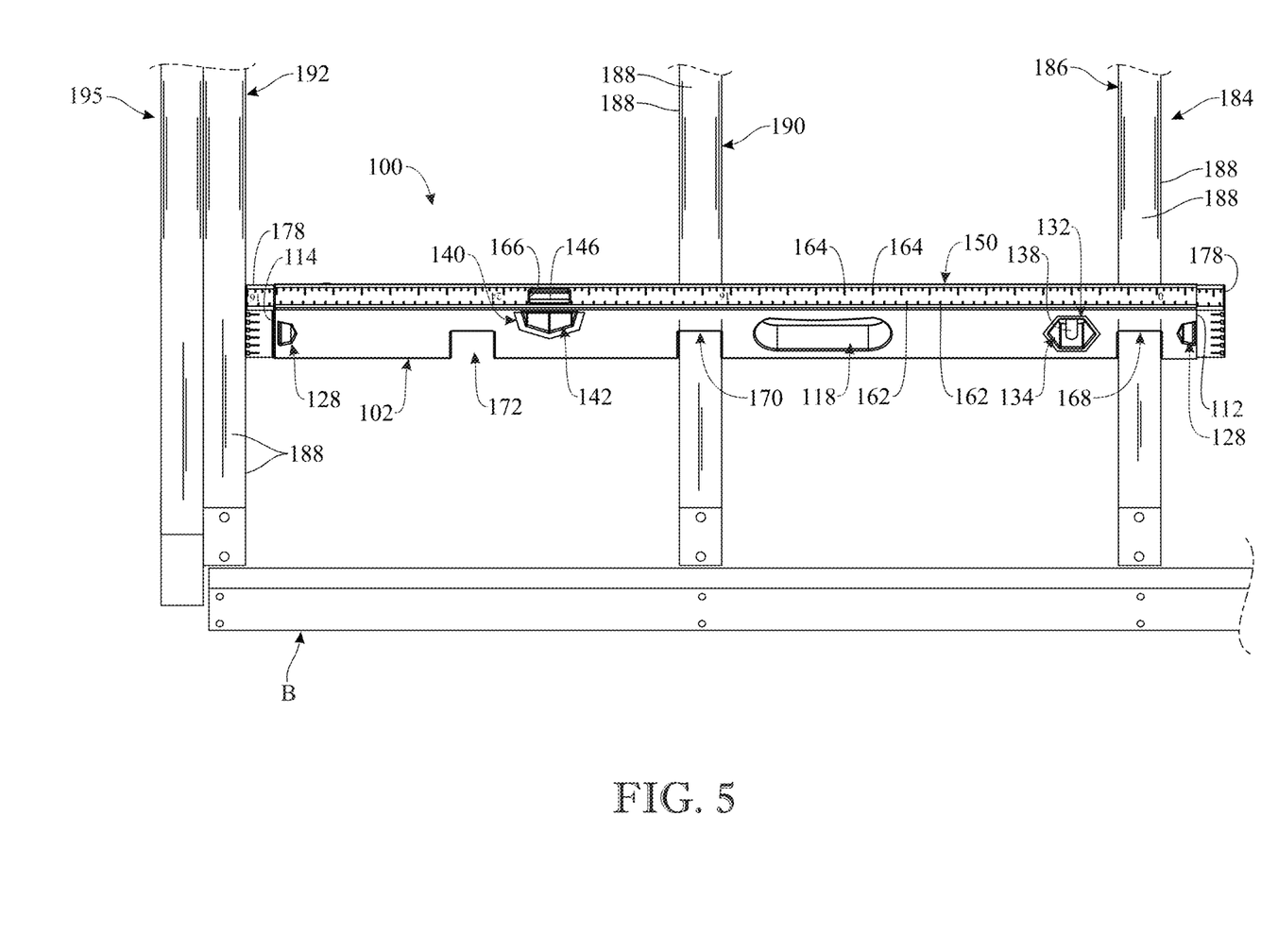
FIG. 5 presents a top perspective view of the leveling and spacing device preparatory to spacing of a third structure member relative to the second structure member by placement of the third structure member against the end bumper at the second body end of the device body in fabrication of the building structure.

As illustrated in FIG. 5, in typical application, the leveling and spacing device 100 may be used to expeditiously deploy structure members 186, 190, 192 of a roof structure, stud wall or other building structure 195 at a desired spacing for securement of the structure members 186, 190, 192 in the structure 195 in construction of a home, office or other building. For example, and without limitation, in some applications, the structure members 186, 190, 192 may include roof trusses or stud wall assemblies which are to be assembled to form a roof or stud wall 195 of the building wherein 16 inches on center spacing is needed. In applications in which the structure members 186, 190, are to be placed at 24-inch spacings, the first structure member 186 may initially be deployed and secured in place, As illustrated in FIG. 4, The second structure member 190 may then be placed adjacent to the first structure member 186. The leveling and spacing device 100 may be lowered in place to "bridge" the first structure member 186 and the second structure member 190 as the first member notch 168 receives the first structure member 186 and the third member notch 172 receives the second structure member 190. The second structure member 190 may then be secured in place. The leveling and spacing device 100 may be removed from the first structure member 186 and the second structure member 190. In applications in which the desired distance spacing between the structure members 186, 190, 192 are to be 16 inches, as illustrated in FIG. 5, such as may be the case in spacing wall studs, the second member notch 170 and the first member notch 168 may be used to sequentially bridge and space the structure members 186, 190, while abutting structure member 192 of the building structure 195 in like manner. Throughout deployment of the structure members 186, 190, 192 in the building structure 195, the vertical level 132 and/or the horizontal level 140 may be used to ensure proper orientation of the structure members 186, 190, 192 with respect to a vertical and/or horizontal plane. The first ruler markings 162 and/or the second ruler markings 164 on the ruler 150 may be used to mark distances between and/or along the structure members 186, 190, 192.

As illustrated in the FIG. 4 application, the first structure member 186 and the second structure member 190 may be bridged, spaced, and secured (typically via a bracing strip A), using the first member notch 168 and the third member notch 172, respectively. As illustrated in the FIG. 5 application, a first structure member 186, A third structure member 192 may be placed adjacent to the second structure member 190 by engagement of the third structure member 192 with the end bumper 178 at the second body end 114 of the device body 102. After their placement in the building structure 195, all 3 of the structure members, first structure member 186, the second structure member 190 and the third structure member 192, may be secured together by a bottom plate B, and the process repeated with any additional structure members.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A leveling and spacing device suitable for expeditiously deploying structure members of a building structure at a desired distance spacing for securement of the structure members in the structure, the leveling and spacing device comprising:
    an elongated device body including a lower body surface, an upper body surface, a front body surface, a rear body surface, a first body end and a second body end;
    at least one level on the device body comprising a horizontal level that includes a horizontal level aperture extending through the device body from the front body surface to the rear body surface and a horizontal level tube spanning the horizontal level aperture;
    at least two spaced-apart member notches in the device body, each of the at least two spaced-apart member notches suitably sized and shaped to accommodate a corresponding structure member of the building structure;
    a ruler that extends along the upper body surface of the device body; and
    a top level opening that extends through the ruler, said top level opening in communication with the horizontal level aperture.

2. The leveling and spacing device of claim 1, further comprising at least one grip aperture that extends through the device body from the front body surface to the rear body surface.

3. The leveling and spacing device of claim 1, wherein the elongated device body contains at least one hanging aperture in the device body.

4. The leveling and spacing device of claim 1, wherein the at least one level comprises a vertical level that includes a vertical level aperture extending through the device body from the front body surface to the rear body surface and a vertical level tube spanning the vertical level aperture.

5. The leveling and spacing device of claim 1, wherein the ruler has a first ruler end proximate the first body end, a second ruler end proximate the second body end, a front ruler edge proximate the front body surface and a rear ruler edge proximate the rear body surface of the device body;
    wherein the ruler contains graduated ruler markings that include a first set of graduated ruler markings extending along the front ruler edge and a second set of graduated ruler markings extending along the rear ruler edge of the ruler; and
    wherein the first set of graduated ruler markings include inch markings and the second set of graduated ruler markings include centimeter markings.

6. The leveling and spacing device of claim 1, wherein two of the spaced-apart member notches are disposed at a distance spacing of 16 inches with respect to each other.

7. The leveling and spacing device of claim 1, wherein two of the spaced-apart member notches are-disposed at a distance spacing of 24 inches with respect to each other.

8. The leveling and spacing device of claim 1, wherein each member notch in the device body has a rectangular or square cross-section with a planar interior notch surface and a pair of parallel, spaced-apart, planar side notch surfaces extending from the interior notch surface.

9. The leveling and spacing device of claim 1, wherein the member notches include a first member notch proximate the first body end of the device body, a second member notch spaced-apart from the first member notch and a third member notch spaced-apart from the second member notch.

10. The leveling and spacing device of claim 1, wherein the at least two spaced-apart member notches in the device body include a first member notch, a second member notch, and a third member notch, said second member notch disposed at a distance spacing of 16 inches ("D2"), D2 measured perpendicularly away from the second body end to a respective distal end of said second member notch, said first member notch disposed at a distance spacing of 16 inches ("D1") from said second member notch, opposite the second body end, D1 measured perpendicularly away from the second body end and at respective distal ends of each of the second member notch and first member notch, respectively, said third member notch disposed at a distance spacing of 24 inches ("D3") from said first member notch, D3 measured perpendicularly away from the second body end and at respective distal ends of each of the third member notch and first member notch, respectively.

11. A leveling and spacing device suitable for expeditiously deploying structure members of a building structure at a desired distance spacing for securement of the structure members in the structure, the leveling and spacing device comprising:

an elongated device body including a lower body surface, an upper body surface, a front body surface, a rear body surface, a first body end and a second body end;

at least one level on the device body;

at least two spaced-apart member notches in the device body, each of the at least two spaced-apart member notches suitably sized and shaped to accommodate a corresponding structure member of the building structure; and at least one attachment clip provided on the device body.

12. The leveling and spacing device of claim 11, further comprising at least one grip aperture that extends through the device body from the front body surface to the rear body surface; and wherein the elongated device body contains at least one hanging aperture in the device body.

13. The leveling and spacing device of claim 11, wherein the at least one level includes a vertical level and a horizontal level, said vertical level including a vertical level aperture extending through the device body from the front body surface to the rear body surface and a vertical level tube spanning the vertical level aperture, and said horizontal level including a horizontal level aperture extending through the device body from the front body surface to the rear body surface and a horizontal level tube spanning the horizontal level aperture.

14. The leveling and spacing device of claim 11, further comprising a ruler that extends along the upper body surface of the device body, said ruler having a first ruler end proximate the first body end, a second ruler end proximate the second body end, a front ruler edge proximate the front body surface and a rear ruler edge proximate the rear body surface of the device body, said ruler further having graduated ruler markings that include a first set of graduated ruler markings extending along the front ruler edge and a second set of graduated ruler markings extending along the rear ruler edge of the ruler.

15. The leveling and spacing device of claim 11, wherein two of the spaced-apart member notches are disposed at a distance spacing of 16 inches with respect to each other.

16. The leveling and spacing device of claim 11, wherein two of the spaced-apart member notches are-disposed at a distance spacing of 24 inches with respect to each other.

17. The leveling and spacing device of claim 11, wherein one of the at least two spaced-apart member notches is disposed at a distance spacing of 16 inches with respect to one of the first body end and the second body end, and to a respective distal end of said one of the at least two spaced-apart member notches.

18. The leveling and spacing device of claim 11, wherein the at least two spaced-apart member notches in the device body include a first member notch, a second member notch, and a third member notch, said second member notch disposed at a distance spacing of 16 inches ("D2"), D2 measured perpendicularly away from the second body end to a respective distal end of said second member notch, said first member notch disposed at a distance spacing of 16 inches ("D1") from said second member notch, opposite the second body end, D1 measured perpendicularly away from the second body end and at respective distal ends of each of the second member notch and first member notch, respectively, said third member notch disposed at a distance spacing of 24 inches ("D3") from said first member notch, D3 measured perpendicularly away from the second body end and at respective distal ends of each of the third member notch and first member notch, respectively.

19. The leveling and spacing device of claim 18, wherein the first body end and the second body end are 36 inches ("D5") apart.

20. The leveling and spacing device of claim 18, wherein the first body end and the second body end are 36 inches ("D5") apart.

* * * * *